US012808528B2

(12) United States Patent
Gou et al.

(10) Patent No.: US 12,808,528 B2
(45) Date of Patent: Nov. 24, 2026

(54) DISPLAY DEVICE

(71) Applicants: Chengdu BOE Optoelectronics Technology Co., Ltd., Chengdu (CN); BOE Technology Group Co., Ltd., Beijing (CN)

(72) Inventors: Qiang Gou, Beijing (CN); Tianjun Deng, Beijing (CN); Xiaolong Tang, Beijing (CN); Rongkun Fan, Beijing (CN); Weiben Zhang, Beijing (CN); Shaopeng Li, Beijing (CN); Hao Deng, Beijing (CN); Wenze Li, Beijing (CN); Jianhua Shu, Beijing (CN); Cheng Zhang, Beijing (CN); Tao Su, Beijing (CN); Fakui Sun, Beijing (CN); Yuan Liu, Beijing (CN); Jing Zhang, Beijing (CN)

(73) Assignees: Chengdu BOE Optoelectronics Technology Co., Ltd., Chengdu (CN); Beijing BOE Technology Development Co., Ltd., Beijing (CN)

( * ) Notice: Subject to any disclaimer, the term of this patent is extended or adjusted under 35 U.S.C. 154(b) by 315 days.

(21) Appl. No.: 18/692,688

(22) PCT Filed: Jul. 31, 2023

(86) PCT No.: PCT/CN2023/110359
§ 371 (c)(1),
(2) Date: Mar. 15, 2024

(87) PCT Pub. No.: WO2024/051396
PCT Pub. Date: Mar. 14, 2024

(65) Prior Publication Data

US 2024/0377054 A1 Nov. 14, 2024

(30) Foreign Application Priority Data

Sep. 7, 2022 (CN) ........................ 202211088816.5

(51) Int. Cl.
*F21V 29/83* (2015.01)

(52) U.S. Cl.
CPC ....... *F21V 29/83* (2015.01); *Y10T 428/24273* (2015.01)

(58) Field of Classification Search
CPC ......................... F21V 29/83; Y10T 428/24273
See application file for complete search history.

(56) References Cited

U.S. PATENT DOCUMENTS

2012/0127642 A1* 5/2012 Rolus Borgward .. G06F 1/1656 361/679.01

FOREIGN PATENT DOCUMENTS

CN 105974623 A 9/2016
CN 111413761 A * 7/2020 ........... G02B 6/0088

(Continued)

OTHER PUBLICATIONS

[NPL-1] Feng et al. (CN 114446173 A); May 6, 2022 (European Patent Office machine translation to English). (Year: 2022).*

(Continued)

*Primary Examiner* — Donald M Flores, Jr.
(74) *Attorney, Agent, or Firm* — WHDA, LLP

(57) ABSTRACT

Provided is a display device. The display device includes a bending adhesive layer, a backlight module and a display module; the backlight module and the display module are connected through the bending adhesive layer; an air flow passage is disposed between the display module and the bending adhesive layer, and a pressure zone exists between the backlight module and the bending adhesive layer; the air flow passage is configured to discharge a bubble existed in the pressure zone.

15 Claims, 9 Drawing Sheets

(56) References Cited

FOREIGN PATENT DOCUMENTS

| | | | | | |
|---|---|---|---|---|---|
| CN | 113078275 | A | | 7/2021 | |
| CN | 114267247 | A | * | 4/2022 | |
| CN | 114284449 | A | * | 4/2022 | |
| CN | 114446173 | A | * | 5/2022 | ............... G09F 9/30 |
| CN | 216927578 | U | | 7/2022 | |
| CN | 114927067 | A | | 8/2022 | |
| CN | 115731791 | A | | 3/2023 | |
| JP | 2010-139990 | A | | 6/2010 | |

OTHER PUBLICATIONS

[NPL-2] Hang et al. (CN 114284449 A); Apr. 5, 2022 (European Patent Office machine translation to English). (Year: 2022).*
[NPL-3] Ye et al. (CN 114267247 A); Apr. 1, 2022 (European Patent Office machine translation to English). (Year: 2022).*
[NPL-4] Hong et al. (CN 111413761 A); Jul. 14, 2020 (European Patent Office machine translation to English). (Year: 2020).*

* cited by examiner

DISPLAY DEVICE

CROSS-REFERENCE TO RELATED APPLICATIONS

The present application claims priority to Chinese patent application No. 202211088816.5, entitled "DISPLAY DEVICE", filed on Sep. 7, 2022 before the China National Intellectual Property Administration, which is incorporated herein in its entirety by reference.

TECHNICAL FIELD

The present disclosure relates to the technical field of display equipment, and more particularly, to a display device.

BACKGROUND

With the continuous development of display devices, people's display requirements for display devices are gradually improved. How to ensure a stable display performance of a display device has become an important index to measure the quality of the display device. At present, the display device includes a backlight module and a display module, and the display module is connected with the backlight module. However, bubbles may occur in a manufacturing process of the display module and the backlight module, leading to a low yield of the display device.

SUMMARY

An embodiment of the present disclosure provides a display device.

The present disclosure solves the above technical problem as follows.

An embodiment of the present disclosure provides a display device, including a bending adhesive layer, a backlight module and a display module;

- the backlight module and the display module are connected through the bending adhesive layer;
- an air flow passage is provided between the display module and the bending adhesive layer, and a pressure zone exists between the backlight module and the bending adhesive layer; and
- when a bubble exists in the pressure zone, the bubble is discharged through the air flow passage.

In some embodiments, a supporting film layer is disposed between the display module and the bending adhesive layer, and the bending adhesive layer includes a first adhesive layer, a polyester resin layer and a second adhesive layer;

- the polyester resin layer is disposed between the first adhesive layer and the second adhesive layer, the first adhesive layer is connected with the backlight module, and the second adhesive layer is connected with the supporting film layer.

In some embodiments, the air flow passage includes a first passage and a second passage;

- the first passage is communicated with the pressure zone, and the first passage is communicated with the second passage; and
- the first passage is disposed in at least one of the first adhesive layer and the polyester resin layer, and the second passage is disposed in at least one of the second adhesive layer and the polyester resin layer.

In some embodiments, the first passage is a plurality of through holes disposed in the first adhesive layer, the plurality of through holes penetrate through the first adhesive layer, and the plurality of through holes extend in a direction perpendicular to the display device; and

- the second passage is a through groove disposed in the polyester resin layer, and the through groove extends from a first surface of the polyester resin layer to a second surface of the polyester resin layer, the first surface of the polyester resin layer and the second surface of the polyester resin layer are two opposite surfaces of the polyester resin layer, and the first surface of the polyester resin layer and the second surface of the polyester resin layer are both parallel to the direction perpendicular to the display device.

In some embodiments, the through groove is formed in a third surface of the polyester resin layer, and the third surface of the polyester resin layer is a surface in contact with the first adhesive layer.

In some embodiments, the polyester resin layer includes a plurality of polyester resin blocks arranged at intervals, and a gap between two adjacent polyester resin blocks forms the through groove.

In some embodiments, the air flow passage includes a first passage and a second passage;

- the first passage is communicated with the pressure zone, and the first passage is communicated with the second passage; and
- the first passage penetrates through the bending adhesive layer and extends from the first adhesive layer to the second adhesive layer, and the second passage is disposed in the supporting film layer.

In some embodiments, the first passage is a plurality of through holes formed in the bending adhesive layer, and the plurality of through holes extend from the first adhesive layer to the second adhesive layer; and

- the second passage is a through groove formed in the supporting film layer, the through groove extends from a first surface of the supporting film layer to a second surface of the supporting film layer, the first surface of the supporting film layer and the second surface of the supporting film layer are two opposite surfaces of the supporting film layer, and the first surface of the supporting film layer and the second surface of the supporting film layer are both parallel to a direction perpendicular to the display device.

In some embodiments, the plurality of through holes are distributed in an array.

In some embodiments, the plurality of through holes are arranged at equal intervals.

In some embodiments, an interval between any two adjacent through holes is 1 mm to 2 mm.

In some embodiments, a groove opening of the through groove and a groove bottom of the through groove have different dimensions in a first direction, the first direction is a direction perpendicular to the display module, the groove opening of the through groove is a part of the through groove close to the backlight module, and the groove bottom of the through groove is a part of the through groove close to the display module.

In some embodiments, the dimension of the groove opening of the through groove in the first direction is less than the dimension of the groove bottom of the through groove in the first direction.

In some embodiments, the backlight module includes an optical film layer, a backboard, a flexible printed circuit board and a battery;

- the bending adhesive layer is fixed in a first region on a first surface of the display module, and the battery is fixed in a second region on the first surface of the display module, the first surface is a surface opposite to a display surface of the display module, the first region is a region in which a bending part of the display device is located, and the second region is a region of the display device other than the bending part; and the backboard is fixed on the bending adhesive layer through the optical film layer, and the flexible printed circuit board is bent and disposed on the backboard.

BRIEF DESCRIPTION OF THE DRAWINGS

In order to describe technical solutions in embodiments of the present disclosure or the related art more clearly, the accompanying drawings which are used in the description of the embodiments or the related art will be briefly introduced. Apparently, the accompanying drawings in the following description illustrate some embodiments of the present disclosure, based on these accompanying drawings, those skilled in the art may obtain other accompanying drawings without paying any creative effort.

REFERENCE NUMERALS

Figure 1:
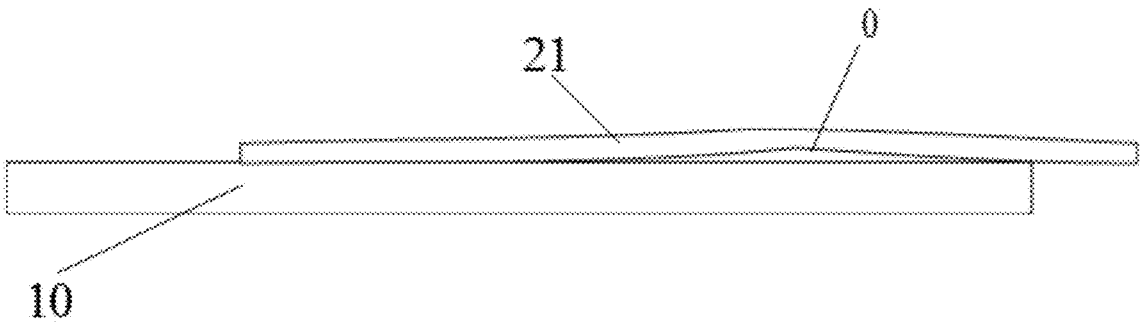
FIG. 1 is a schematic diagram showing a bubble existing between a display module and a bending adhesive layer in the related art.

10. bending adhesive layer; 20. backlight module; 30. display module; 40. air flow passage; 50. supporting film layer; 11. first adhesive layer; 12. polyester resin layer; 13. second adhesive layer; 21. optical film layer; 22. backboard; 23. flexible printed circuit board; 24. battery; 41. first passage; 42. second passage; and 121. polyester resin block.

DETAILED DESCRIPTION OF THE EMBODIMENTS

Technical solutions in some embodiments of the present disclosure will be clearly and thoroughly described below with reference to the accompanying drawings. Apparently, the described embodiments are only some of the embodiments of the present disclosure, rather than all of the embodiments. Based on the embodiments provided by this disclosure, all other embodiments obtained by those skilled in the art fall within the scope of protection of this disclosure.

Unless it is otherwise defined in the context, throughout the specification and claims, the term "comprise" and other forms thereof, such as "comprises" and "comprising", are interpreted as open and inclusive meanings, that is, "comprising, but not limited to". In the description of the specification, the terms "an embodiment", "some embodiments", "an exemplary embodiment", "an example", "specific examples" or "some examples" are intended to indicate that specific features, structures, materials or characteristics related to the embodiment or example are included in at least one embodiment or example of the present disclosure. Schematic representations of the above terms do not necessarily refer to the same embodiment or example. Furthermore, the particular features, structures, materials or characteristics described may be included in any suitable manner in any one or more embodiments or examples.

Hereinafter, the terms "first" and "second" are only used for descriptive purposes and cannot be understood as indicating or implying relative importance or implicitly indicating the quantity of indicated technical features. Therefore, features defined as "first" and "second" may explicitly or implicitly include one or more of these features. In the description of the embodiments of the present disclosure, unless otherwise specified, "a plurality of" means two or more.

Expressions of "electrical connection" and its derivatives may be used in describing some embodiments. For example, the term "electrical connection" may be used in describing some embodiments to indicate that two or more components are in a direct physical contact or electrical contact with each other.

"A and/or B" includes the following three combinations: only A, only A, and a combination of A and B.

The use of "configured to" herein means an open and inclusive language, which does not exclude equipment suitable for or configured for executing additional tasks or steps.

As used herein, "approximately" includes the stated value as well as the average value within the acceptable deviation range of a specific value, and the acceptable deviation range is determined by those skilled in the art in consideration of the measurement in discussion and the error associated with the measurement of a specific quantity (that is, the limitation of the measurement system).

The "homo-layer" herein refers to a layer structure formed by using the same film forming process to form a film layer for forming a specific pattern, and then using the same mask to carry out a primary patterning process. According to different specific patterns, the primary patterning process may include multiple times of exposure, development or etching processes, the specific patterns in the formed layer structure may be continuous or discontinuous, and these specific patterns may also be at different heights or have different thicknesses. On the contrary, the "hetero-layer" refers to a layer structure formed by using corresponding film forming processes to form film layers for forming specific patterns respectively, and then using corresponding mask plates to carry out a patterning process. For example, the "hetero-layer arrangement of two layer structures" means that the two layer structures are formed under corresponding process steps (the film forming process and the patterning process) respectively.

Exemplary embodiments are described herein with reference to cross-sectional views and/or plan views as idealized exemplary drawings. In the drawings, the thicknesses of layers and regions are enlarged for clarity. Therefore, variations in shape relative to the drawings caused by, for example, manufacturing techniques and/or tolerances can be envisaged. Therefore, the exemplary embodiments should not be interpreted as being limited to the shapes of the regions shown herein, but includes shape deviations caused by, for example, manufacturing. For example, an etched region shown as a rectangle will generally have a bending feature. Therefore, the regions shown in the drawings are schematic in nature, and their shapes are not intended to show the actual shapes of the regions of the equipment, and are not intended to limit the scope of the exemplary embodiments.

Figure 2:
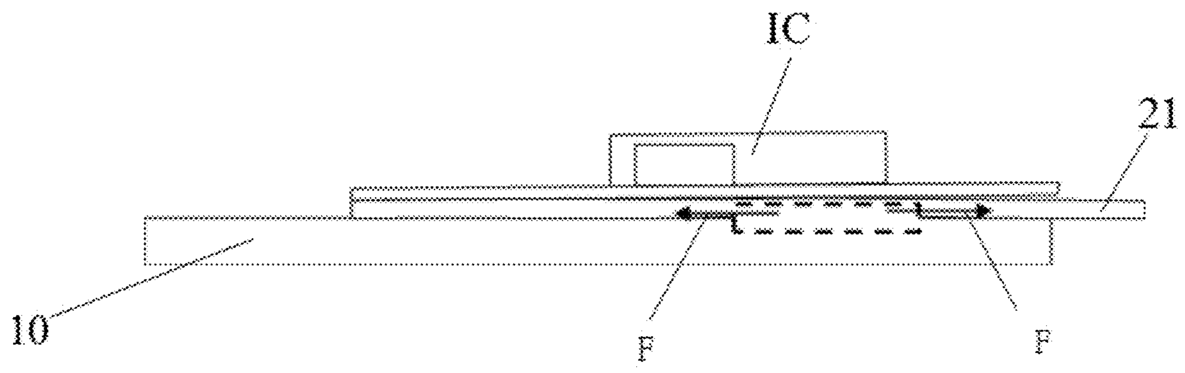
FIG. 2 is a schematic diagram showing a flowing of a bubble in the related art.

Before introducing a display device provided by an embodiment of the present disclosure, a manufacturing process and existing technical problems of a display device in the related art are described first. Specifically, as shown in FIG. 1 and FIG. 2, the display device includes a bending adhesive layer 10, a backlight module 20 and a display module 30, and the backlight module 20 and the display module 30 are connected through the bending adhesive layer 10. Moreover, a pressure zone exists between the backlight module 20 and the bending adhesive layer 10, a bubble may be generated in the pressure zone, and the bubble flows between the backlight module 20 and the bending adhesive layer 10, which leads to easy separation between the backlight module 20 and the display module 30. Accordingly, the yield of the display devices is low. 'O' in FIG. 1 indicates a bubble, and a flow direction of the bubble between the backlight module 20 and the bending adhesive layer 10 is a direction indicated by F in FIG. 2.

As shown in FIG. 3 to FIG. 22, the display device includes a bending adhesive layer 10, a backlight module 20 and a display module 30.

The backlight module 20 and the display module 30 are connected through the bending adhesive layer 10. An air flow passage 40 is provided between the display module 30 and the bending adhesive layer 10, and a pressure zone exists between the backlight module 20 and the bending adhesive layer 10. When a bubble exists in the pressure zone, the bubble is discharged through the air flow passage 40.

In the embodiment of the present disclosure, the backlight module 20 and the display module 30 are connected through the bending adhesive layer 10, the air flow passage 40 is provided between the display module 30 and the bending adhesive layer 10, and the pressure zone exists between the backlight module 20 and the bending adhesive layer 10. Therefore, if a bubble exists in the pressure zone, it may be discharged from the air flow passage 40, thereby avoiding a possible separation between the backlight module 20 and the display module 30 caused by a rescued contact area between the backlight module 20 and the display module 30 due to the accumulation of bubbles in the pressure zone, which further avoids the problem of an increased defective rate of the display devices. That is, in the embodiment of the present disclosure, the air flow passage 40 is provided between the display module 30 and the bending adhesive layer 10, so that the bubbles in the pressure zone are discharged through the air flow passage 40, thereby increasing the contact area between the backlight module 20 and the display module 30, and improving the yield of the display devices.

It should be noted that, in the embodiment of the present disclosure, the backlight module 20 may include an optical film layer 21, a backboard 22, a flexible printed circuit board 23 and a battery 24. The bending adhesive layer 10 is fixed in a first region on a first surface of the display module 30, and the battery 24 is fixed in a second region on the first surface of the display module 30. The first surface is a surface opposite to a display surface of the display module 30, the first region is a region in which a bending part of the display device is located, and the second region is a region of the display device other than the bending part. The backboard 22 is fixed on the bending adhesive layer 10 through the optical film layer 21, and the flexible printed circuit board 23 is bent on the backboard 22.

Figure 3:
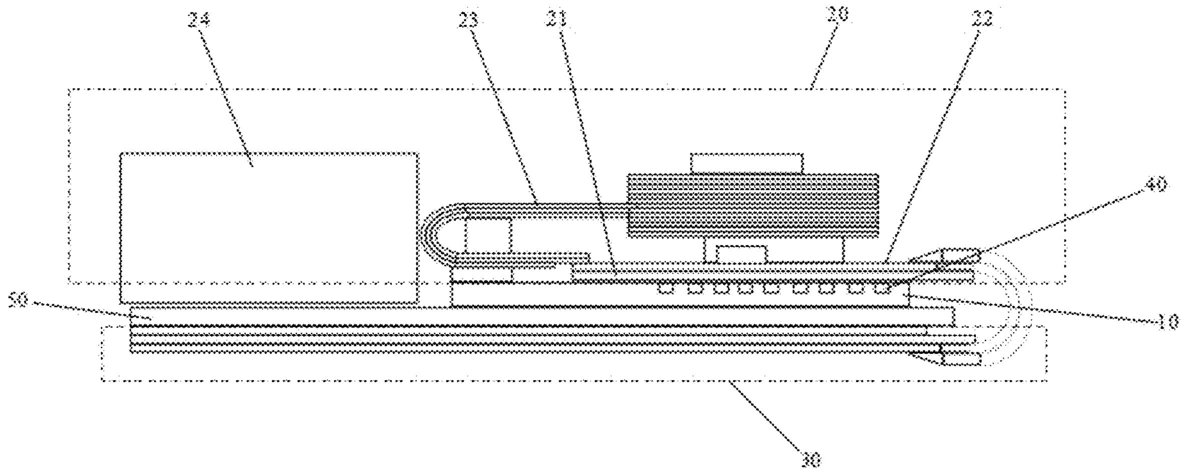
FIG. 3 is a schematic structural diagram of a display device provided by an embodiment of the present disclosure.

In addition, in some embodiments, as shown in FIG. 3, a supporting film layer 50 is provided between the display module 30 and the bending adhesive layer 10, and the bending adhesive layer 10 includes a first adhesive layer 11, a polyester resin layer 12 and a second adhesive layer 13. The polyester resin layer 12 is arranged between the first adhesive layer 11 and the second adhesive layer 13, the first adhesive layer 11 is connected with the backlight module 20, and the second adhesive layer 13 is connected with the supporting film layer 50.

Because the bending adhesive layer 10 includes the first adhesive layer 11, the polyester resin layer 12 and the second adhesive layer 13, and the polyester resin layer 12 is arranged between the first adhesive layer 11 and the second adhesive layer 13, the first adhesive layer 11 is connected with the backlight module 20, that is, the first adhesive layer 11 is adhered to the backlight module 20, and the second adhesive layer 13 is connected with the supporting film layer

50, that is, the second adhesive layer 13 is adhered to the supporting film layer 50. Moreover, the supporting film layer 50 is provided between the display module 30 and the bending adhesive layer 10, so that the supporting film layer 50 may support the display module 30 to some extent, which is beneficial for the display of the display module 30.

In addition, in the embodiment of the present disclosure, the air flow passage 40 may be formed by different methods, and specifically, the following methods are taken as examples for description.

Figure 4:
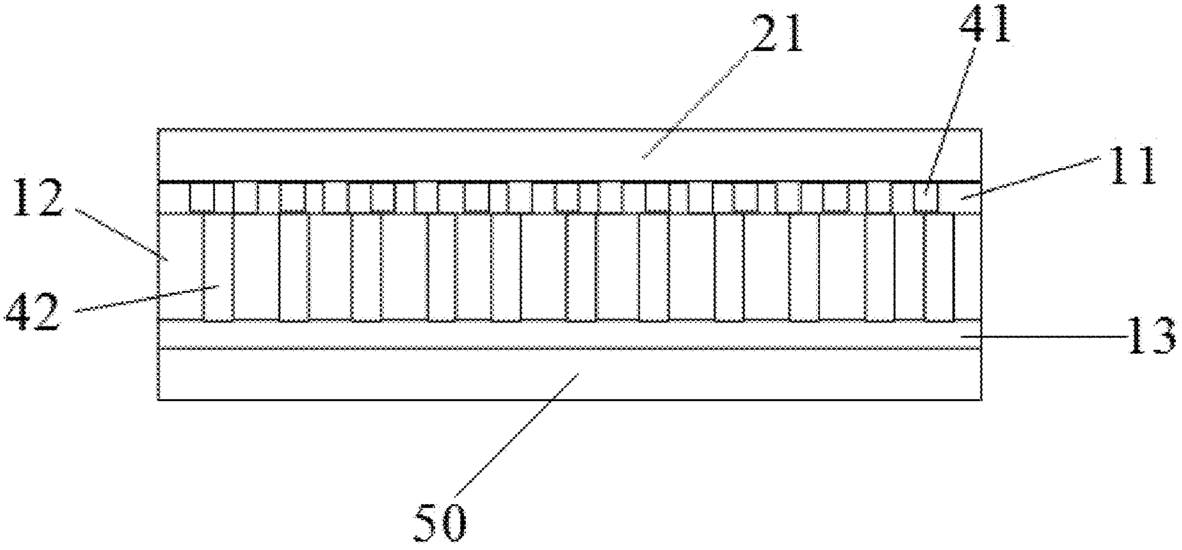
FIG. 4 is a first schematic diagram showing disposing an air flow passage in a bending adhesive layer provided by an embodiment of the present disclosure.
Figure 5:
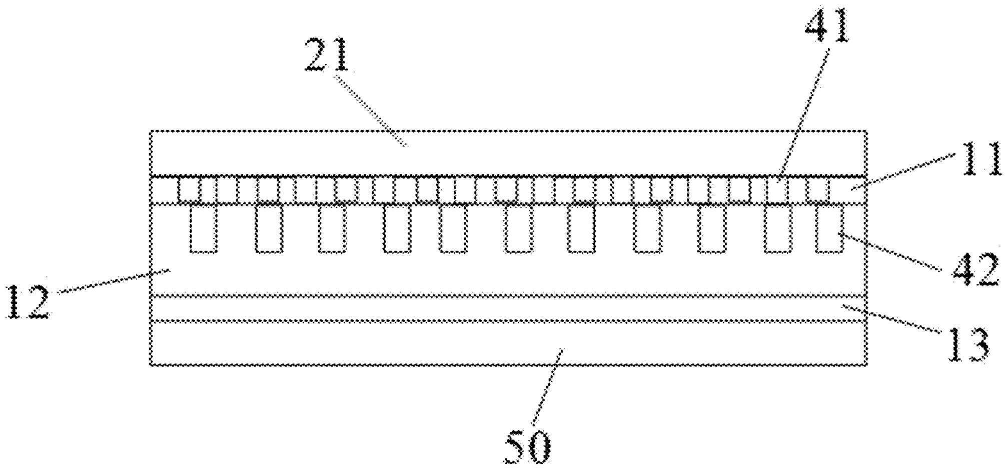
FIG. 5 is a second schematic diagram showing disposing an air flow passage in a bending adhesive layer provided by an embodiment of the present disclosure.

Method (1): as shown in FIG. 4 or FIG. 5, the air flow passage 40 may include a first passage 41 and a second passage 42. The first passage 41 is communicated with the pressure zone, and the first passage 41 is communicated with the second passage 42. The first passage 41 is disposed in at least one of the first adhesive layer 11 and the polyester resin layer 12, and the second passage 42 is disposed in at least one of the second adhesive layer 13 and the polyester resin layer 12.

Because the first passage 41 is communicated with the pressure zone, gas in the bubble in the pressure zone may enter the first passage 41. Because the first passage 41 is communicated with the second passage 42, the gas entering the first passage 41 may enter the second passage 42 and be discharged from the second passage 42, so that the gas in the bubble in the pressure zone may be discharged. Moreover, the first passage 41 is disposed in at least one of the first adhesive layer 11 and the polyester resin layer 12, and the second passage 42 is disposed in at least one of the second adhesive layer 13 and the polyester resin layer 12, in other words, the air flow passage 40 is only disposed in the bending adhesive layer 10, thus avoiding the problem that strengths of other layers are affected by disposing the air flow passage 40 in other layers.

It should be noted that the first passage 41 may be only disposed in the first adhesive layer 11, the first passage 41 may also be only disposed in the polyester resin layer 12, and the first passage 41 may also be disposed in both of the first adhesive layer 11 and the polyester resin layer 12. Further, the second passage 42 may be only disposed in the second adhesive layer 13, the second passage 42 may also be only disposed in the polyester resin layer 12, and the second passage 42 may also be disposed in both of the second adhesive layer 13 and the polyester resin layer 12. The arrangement of the first passage and the arrangement of the second passage are not limited by the embodiment of the present disclosure herein.

Figure 6:
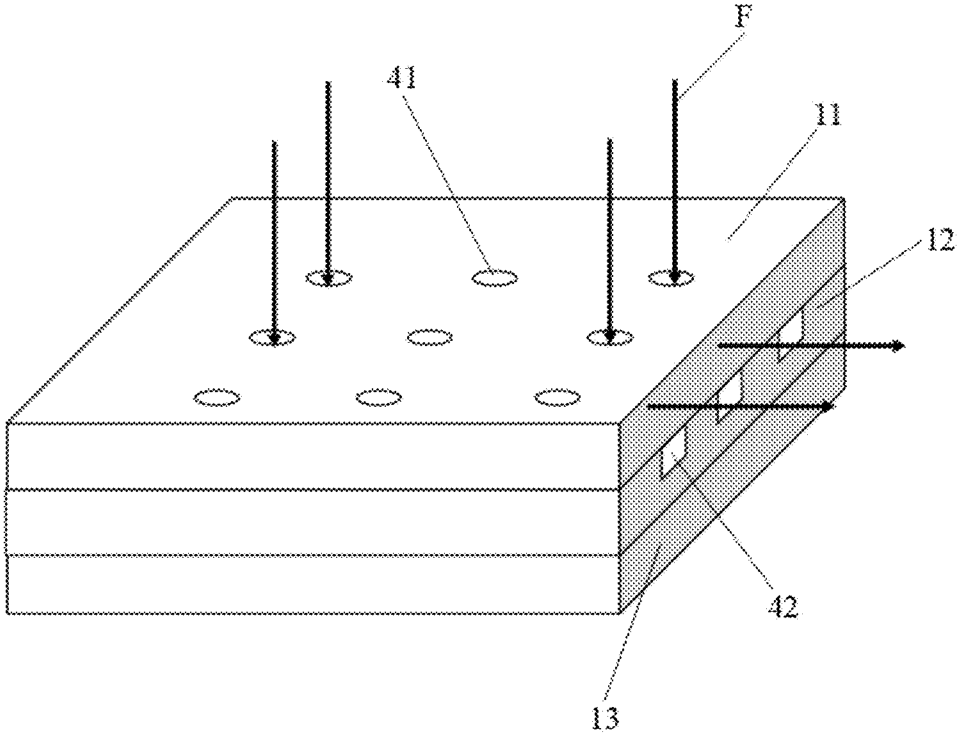
FIG. 6 is a third schematic diagram showing disposing an air flow passage in a bending adhesive layer provided by an embodiment of the present disclosure.
Figure 7:
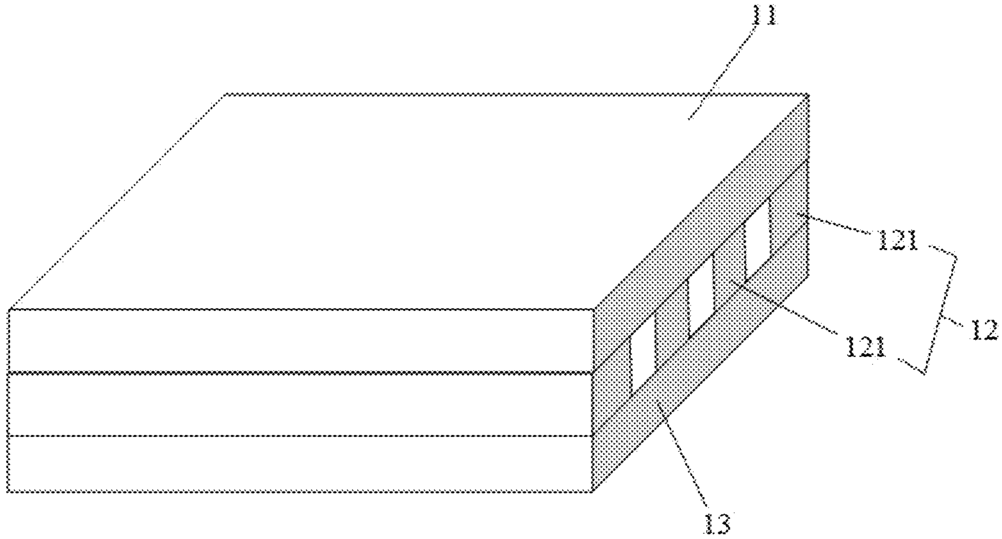
FIG. 7 is a fourth schematic diagram showing disposing an air flow passage in a bending adhesive layer provided by an embodiment of the present disclosure.
Figure 8:
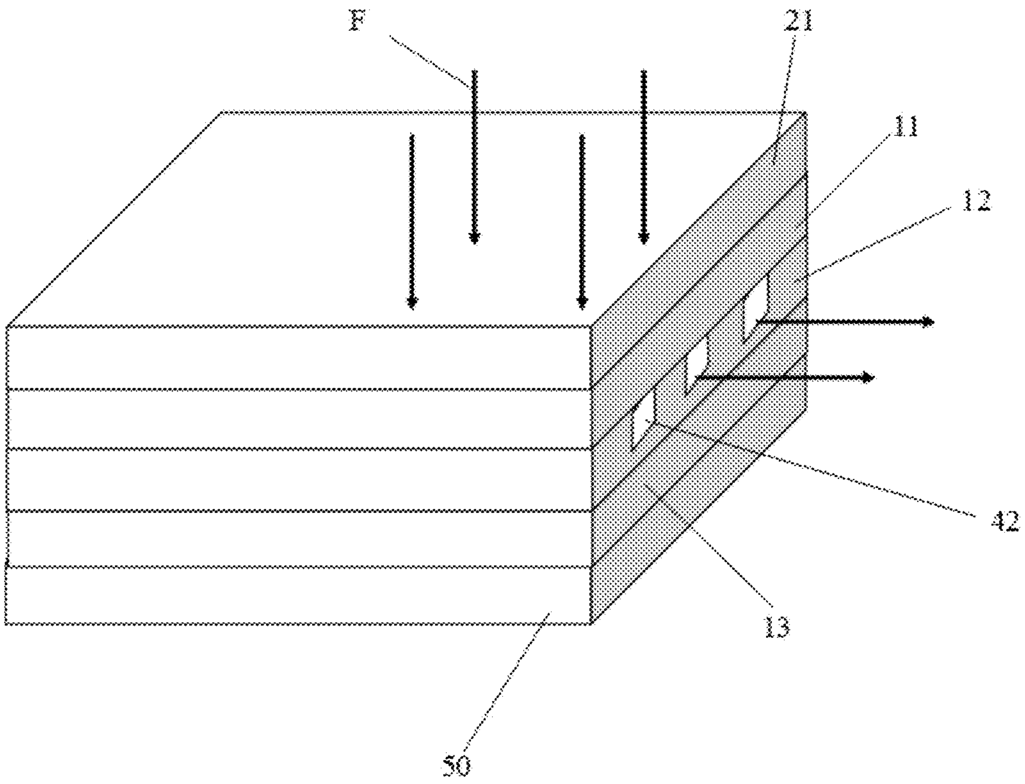
FIG. 8 is a fifth schematic diagram showing disposing an air flow passage in a bending adhesive layer provided by an embodiment of the present disclosure.
Figure 9:
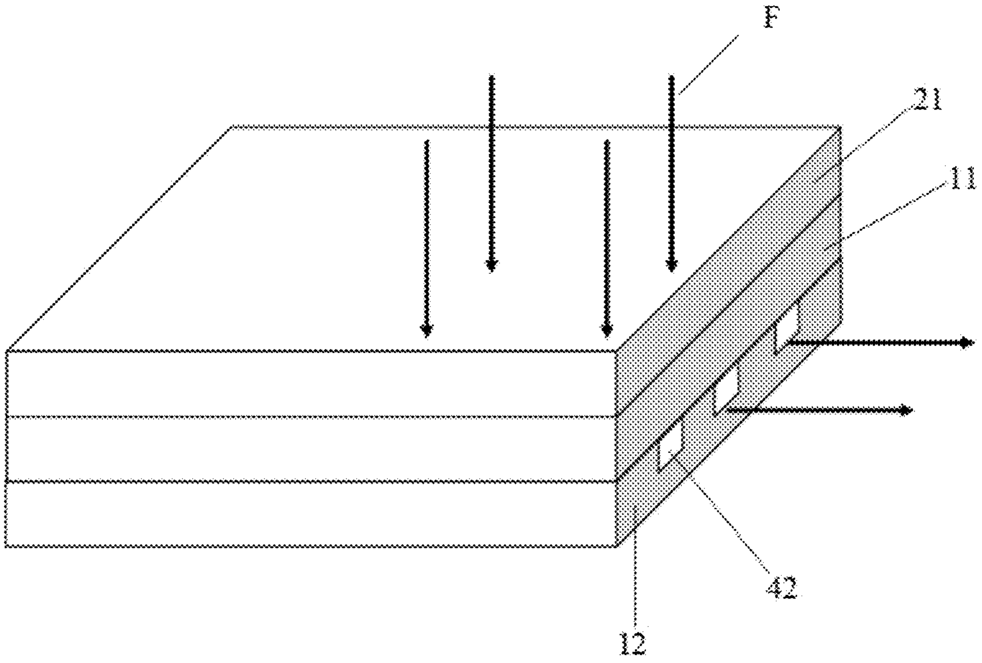
FIG. 9 is a fifth schematic diagram showing disposing an air flow passage in a bending adhesive layer provided by an embodiment of the present disclosure.
Figure 10:
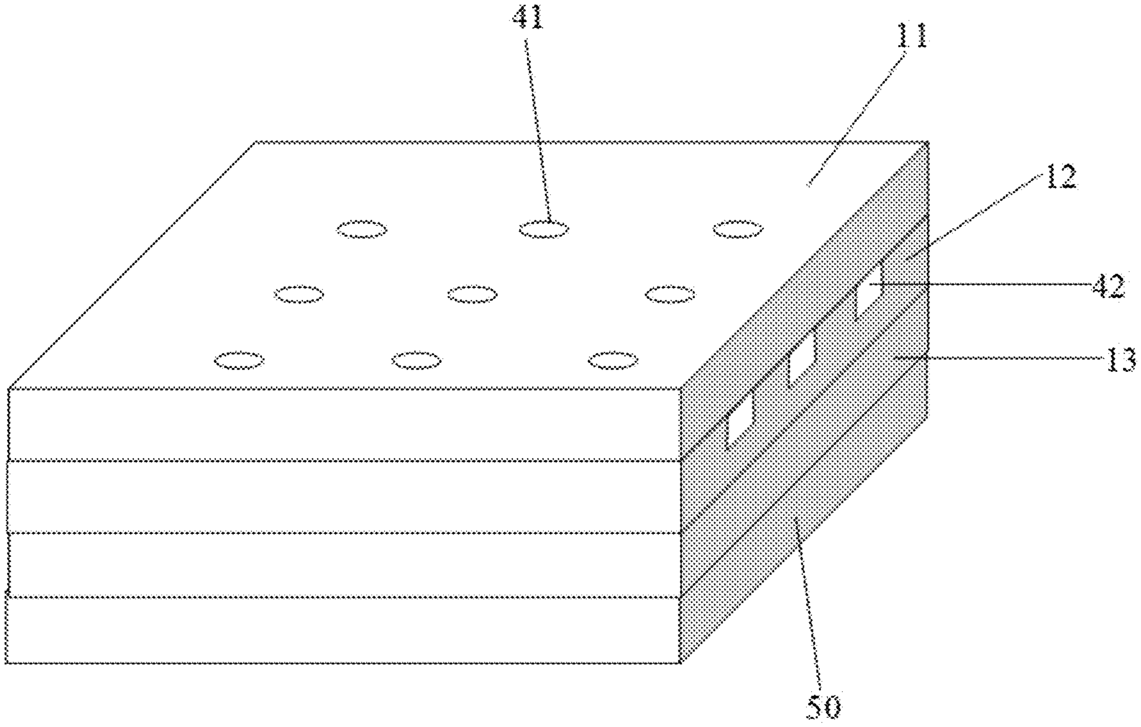
FIG. 10 is a sixth schematic diagram showing disposing an air flow passage in a bending adhesive layer provided by an embodiment of the present disclosure.
Figure 11:
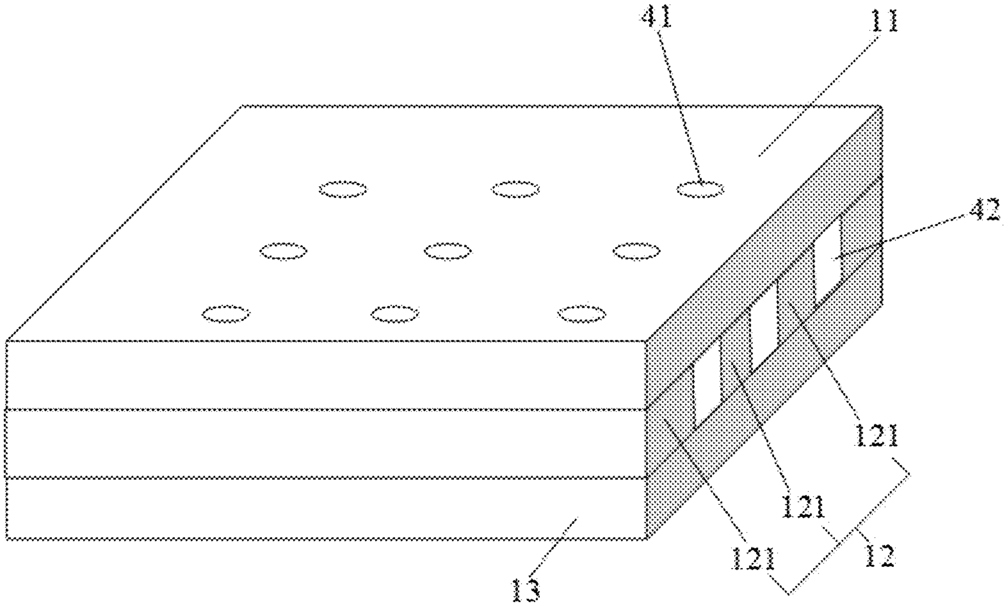
FIG. 11 is a seventh schematic diagram showing disposing an air flow passage in a bending adhesive layer provided by an embodiment of the present disclosure.

In addition, in some embodiments, as shown in FIG. 6 or FIG. 7, the first passage 41 may be a plurality of through holes disposed in the first adhesive layer 11, the plurality of through holes penetrate through the first adhesive layer 11, and the plurality of through holes extend in a direction perpendicular to the display device. The second passage 42 is a through groove disposed in the polyester resin layer 12, and the through groove extends from a first surface of the polyester resin layer 12 to a second surface of the polyester resin layer 12. The first surface of the polyester resin layer 12 and the second surface of the polyester resin layer 12 are two opposite surfaces of the polyester resin layer 12, and the first surface of the polyester resin layer 12 and the second surface of the polyester resin layer 12 are both parallel to the direction perpendicular to the display device.

When the first passage 41 is the plurality of through holes disposed in the first adhesive layer 11 and penetrating through the first adhesive layer 11, the gas in the bubble in the pressure zone may enter the plurality of through holes. The second passage is the through groove in the polyester resin layer 12, and the through groove extends from the first surface of the polyester resin layer 12 to the second surface of the polyester resin layer 12, in other words, the through groove penetrates through the polyester resin layer 12 in a direction from the first surface to the second surface, so that the gas entering the through holes may enter the through groove, and then flow out from a groove opening of the through groove located in the first surface or from a groove opening of the through groove located in the second surface, thus preventing the bubble from existing in the pressure zone, and making the gas in the bubble flow out quickly. A flow direction of the bubble is a direction indicated by F in FIG. 6.

The polyester resin layer 12 has a surface oriented to the first adhesive layer 11, the first surface may be perpendicular to the surface of the polyester resin layer 12 oriented to the first adhesive layer 11, and the second surface may also be perpendicular to the surface of the polyester resin layer 12 oriented to the first adhesive layer 11.

It should be noted that a shape of the through hole may be set according to an actual need, for example, the through hole is a circular hole, and for another example, the through hole is a square hole. The specific shape of the through hole is not limited by the embodiment of the present disclosure herein.

In addition, in some embodiments, as shown in FIG. 6, the through groove is formed in a third surface of the polyester resin layer 12, and the third surface of the polyester resin layer 12 is a surface in contact with the first adhesive layer 11.

When the through groove is disposed in the third surface of the polyester resin layer 12, the through hole in the first adhesive layer 11 may be communicated with the through groove, so that the gas in the bubble in the pressing area may flow out from the through groove. In addition, when the through groove is disposed in the third surface of the polyester resin layer 12, the through groove has little influence on a strength of the polyester resin layer 12, and an overall adhesive capability of the bending adhesive layer 10 is slightly changed, so that an overall structure of the bending adhesive layer 10 is relatively stable.

It should be noted that, in the case that the through groove is disposed in the third surface of the polyester resin layer 12, when the bending adhesive layer 10 is formed, a base film may be acquired first, then the second adhesive layer 13 is attached to the base film, and then the polyester resin layer 12, one surface of which is provided with the through groove, is acquired, the surface of the polyester resin layer 12 without the through groove is attached to the second adhesive layer 13, and then the first adhesive layer 11 provided with a plurality of through holes is acquired, and the first adhesive layer 11 is attached to the surface of the polyester resin layer 12 provided with the through groove.

In addition, in some embodiments, as shown in FIG. 7, the polyester resin layer 12 includes a plurality of polyester resin blocks 121 that are arranged at intervals, and a gap between two adjacent polyester resin blocks 121 forms the through groove.

When the polyester resin layer 12 includes the plurality of polyester resin blocks 121, the plurality of polyester resin blocks 121 may be directly adhered to the second adhesive layer 13, and the plurality of polyester resin blocks 121 are distributed at intervals, so that the gap between two adjacent polyester resin blocks 121 may form the through groove. The through groove may be used as the second passage 42, so that the gas flows out from the through groove. In addition, when the polyester resin layer 12 includes the plurality of polyester resin blocks 121, the plurality of polyester resin blocks 121 may be directly adhered to the second adhesive layer 13, so that a machining process for machining the bending adhesive layer is relatively simple.

It should be noted that, in the case that the polyester resin layer 12 includes the plurality of polyester resin blocks 121, when the bending adhesive layer 10 is formed, the base film may be acquired first, then the second adhesive layer 13 is attached to the base film, and then the plurality of polyester resin blocks 121 are acquired, the plurality of polyester resin blocks 121 are attached to the second adhesive layer 13 so that the plurality of polyester resin blocks 121 are distributed at intervals and a gap exists between two adjacent polyester resin blocks 121, and then the first adhesive layer 11 provided with the plurality of through holes is acquired, and the first adhesive layer 11 is attached to the plurality of polyester resin blocks 121.

Figure 13:
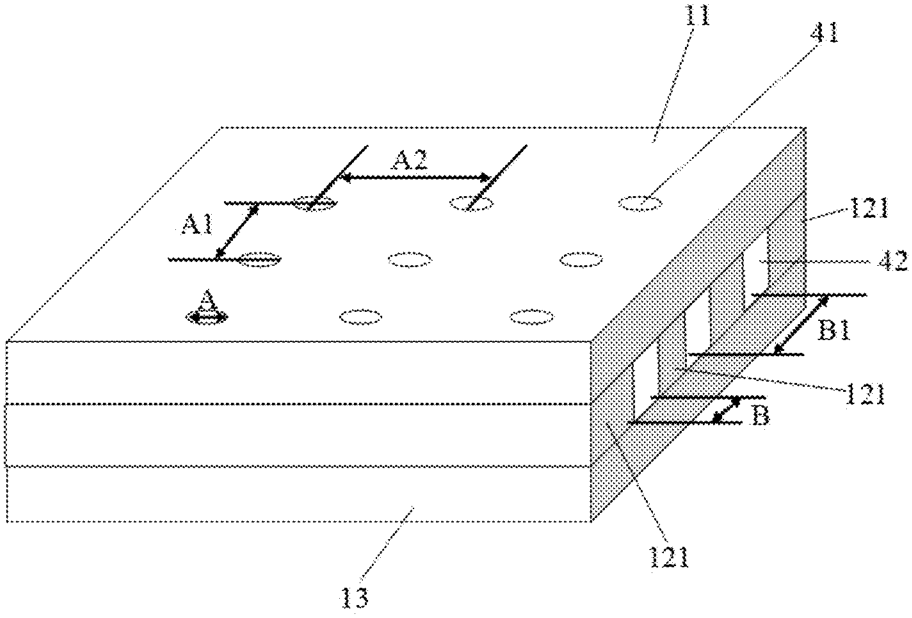
FIG. 13 is a ninth schematic diagram showing disposing an air flow passage in a bending adhesive layer provided by an embodiment of the present disclosure.
Figure 14:
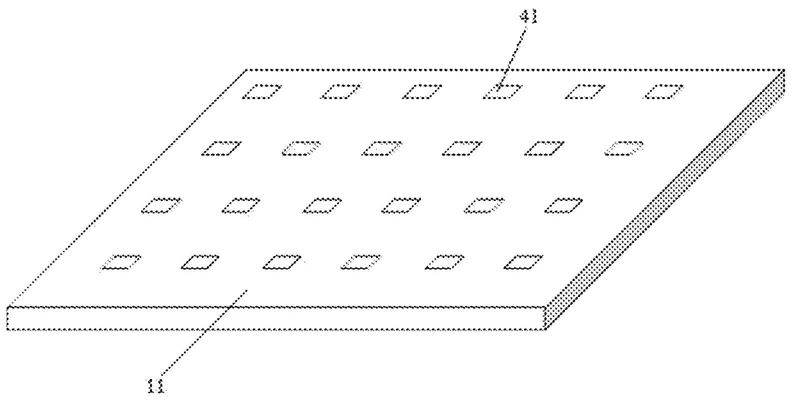
FIG. 14 is a first schematic diagram showing disposing a first passage in a first adhesive layer provided by an embodiment of the present disclosure.

In addition, in the embodiment of the present disclosure, when the polyester resin layer 12 is provided with the through grooves, the first adhesive layer 11 is provided with the through holes penetrating through the first adhesive layer 11, one through groove may be communicated with the plurality of through holes, and a width of the through groove may be greater than an aperture of the through hole, thus ensuring that the gas entering the through holes may all enter the through groove. For example, as shown in FIG. 13, the width of the through groove is B, the aperture of the through hole is A, and B is 1 to 1.5 times greater than A, that is, B=A*(1 to 1.5). In addition, when the supporting film layer 50 is provided with a plurality of through grooves, a distance between middle lines of two adjacent through grooves in the plurality of through grooves is greater than the aperture of the through hole. For example, as shown in FIG. 13, the distance between the middle lines of two adjacent through grooves is B1, the aperture of the through hole is A, and B1 is 2 to 3 times greater than A, that is, B1=A*(2 to 3). The through groove in the polyester resin layer may be the through groove in the third surface of the polyester resin layer or the through groove formed by the gap between two adjacent polyester resin blocks.

Figure 12:
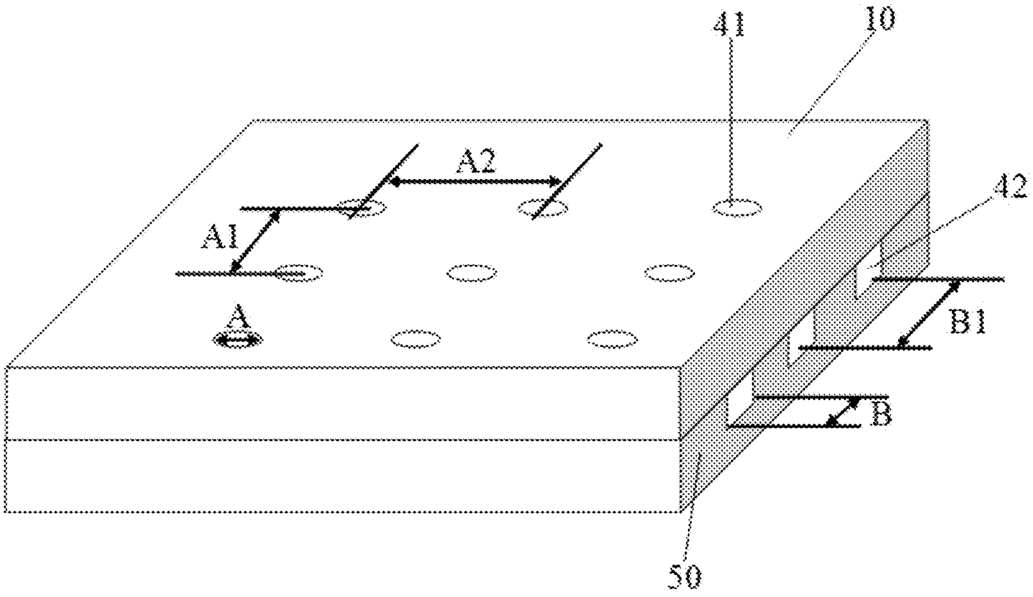
FIG. 12 is an eighth schematic diagram showing disposing an air flow passage in a bending adhesive layer provided by an embodiment of the present disclosure.

Method (2): as shown in FIG. 12, the air flow passage 40 may include a first passage 41 and a second passage 42. The first passage 41 is communicated with the pressure zone, and the first passage 41 is communicated with the second passage 42. The first passage 41 penetrates through the bending adhesive layer 10 and extends from the first adhesive layer 11 to the second adhesive layer 13, and the second passage 42 is disposed in the supporting film layer 50.

Because the first passage 41 is communicated with the pressure zone, gas in the bubble in the pressure zone may enter the first passage 41. Because the first passage 41 is communicated with the second passage 42, the gas entering the first passage 41 may enter the second passage 42 and be discharged from the second passage 42, so that the gas in the bubble in the pressure zone may be discharged. In addition, the first passage 41 penetrates through the bending adhesive layer 10, and the second passage 42 is disposed in the supporting film layer 50, so that the gas in the bubble in the pressure zone enters the first passage 41, and then the gas may pass through the bending adhesive layer 10, so as to enter the second passage 42 in the supporting film layer 50 and be discharged from the second passage 42 in the supporting film layer 50.

In addition, in some embodiments, the first passage 41 may be a plurality of through holes formed in the bending adhesive layer 10, and the plurality of through holes extend from the first adhesive layer 11 to the second adhesive layer 13. The second passage 42 is a through groove formed in the supporting film layer 50, the through groove extends from a first surface of the supporting film layer 50 to a second surface of the supporting film layer 50. The first surface of the supporting film layer 50 and the second surface of the supporting film layer 50 are two opposite surfaces of the supporting film layer 50, and the first surface of the supporting film layer 50 and the second surface of the supporting film layer 50 are both parallel to the direction perpendicular to the display device.

When the first passage 41 is the plurality of through holes formed in the bending adhesive layer 10, and the plurality of through holes extend from the first adhesive layer 11 to the second adhesive layer 13, in other words, when the bending adhesive layer 10 is provided with through holes penetrating through the bending adhesive layer 10, the through holes are served as the first passage 41, so that the gas in the bubble in the pressure zone may enter the through holes. In addition, the second passage is the through groove formed in the supporting film layer 50, and the through groove extends from the first surface of the supporting film layer 50 to the second surface of the supporting film layer 50, in other words, the through groove penetrates through the supporting film layer 50 in a direction from the first surface to the second surface of the supporting film layer 50, so that the gas entering the through holes may enter the through groove, and then flow out from a groove opening of the through groove located in the first surface or from a groove opening of the through groove located in the second surface, thus preventing the bubble from existing in the pressure zone, and making the gas in the bubble flow out quickly.

The supporting film layer 50 has a surface oriented to the second adhesive layer 13, the first surface may be perpendicular to the surface of the supporting film layer 50 oriented to the second adhesive layer 13, and the second surface may also be perpendicular to the surface of the supporting film layer 50 oriented to the second adhesive layer 13.

It should be noted that a shape of the through hole may be set according to an actual need, for example, the through hole is a circular hole, and for another example, the through hole is a square hole. The specific shape of the through hole is not limited by the embodiment of the present disclosure herein.

In addition, in the embodiment of the present disclosure, when the supporting film layer 50 is provided with through grooves, the bending adhesive layer is provided with through holes penetrating through the bending adhesive layer, one through groove may be communicated with the plurality of through holes, and a width of the through groove may be greater than an aperture of the through hole, thus ensuring that the gas entering the through holes may all enter the through groove. For example, as shown in FIG. 12, the width of the through groove is B, the aperture of the through hole is A, and B is 1 to 1.5 times greater than A, that is, B=A*(1 to 1.5). In addition, when the supporting film layer 50 is provided with a plurality of through grooves, a distance between middle lines of two adjacent through grooves in the plurality of through grooves is greater than the aperture of the through hole. For example, as shown in FIG. 12, the distance between the middle lines of two adjacent through grooves is B1, the aperture of the through hole is A, and B1 is 2 to 3 times greater than A, that is, B1=A*(2 to 3).

In addition, in some embodiments, as shown in FIG. 19 to FIG. 22, the plurality of through holes are arranged in an array.

The plurality of through holes are arranged in an array means that the plurality of through holes in the first adhesive layer 11 are arranged in an array, or the plurality of through holes penetrating through the bending adhesive layer 10 are arranged in an array. In addition, the bending adhesive layer 10 includes the first adhesive layer 11 and the second adhesive layer 13. In this case, no matter the plurality of through holes in the first adhesive layer 11 are arranged in an array or the plurality of through holes penetrating through the bending adhesive layer 10 are arranged in an array, the plurality of through holes penetrate through at least one adhesive layer, so that the through holes may have a certain influence on an adhesive performance of the adhesive layer. However, the array distribution of the through holes can minimize the influence of the through holes on the adhesive performance of the adhesive layer, which is beneficial for the adhesion of the adhesive layer.

It should be noted that the plurality of through holes may be distributed in an S-shaped array, that is, a target number of through holes in the plurality of through holes are distributed in a shape of S, so that a plurality of through holes distributed in the S-shaped array may be distributed in the adhesive layer in an array. Certainly, the target number of through holes in the plurality of through holes may also form a square, so that a plurality of through holes distributed in a square array may be distributed in the adhesive layer in an array. A specific form of the array distribution of the plurality of through holes is not limited in the present disclosure.

In addition, in some embodiments, the plurality of through holes are arranged at equal intervals.

When the plurality of through holes are arranged at equal intervals, that is, when the interval between any two adjacent through holes is the same, and the plurality of through holes are evenly distributed, the plurality of through holes have a small influence on the adhesive layer, that is, the plurality of through holes have a small influence on the adhesive performance of the adhesive layer. For example, as shown in FIG. 12, A1 represents an interval between two adjacent through holes, A2 represents an interval between another two adjacent through holes, and A1=A2.

In addition, in the embodiment of the present disclosure, an interval between any two adjacent through holes is 1 mm to 2 mm. That is, the interval between any two adjacent through holes may be any value in a range from 1 mm to 2 mm, for example, the interval between two adjacent through holes is 1 mm, for another example, the interval between two adjacent through holes is 1.5 mm, and for another example, the interval between two adjacent through holes is 2 mm.

Figure 16:
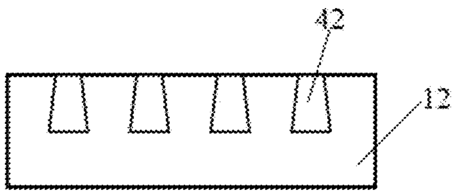
FIG. 16 is a second schematic diagram showing disposing a second passage in a polyester resin layer provided by an embodiment of the present disclosure.
Figure 17:
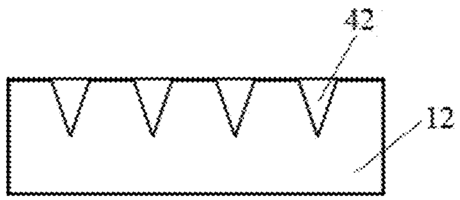
FIG. 17 is a third schematic diagram showing disposing a second passage in a polyester resin layer provided by an embodiment of the present disclosure.
Figure 18:
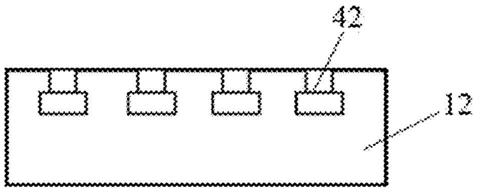
FIG. 18 is fourth schematic diagram showing disposing a second passage in a polyester resin layer provided by an embodiment of the present disclosure.
Figure 19:
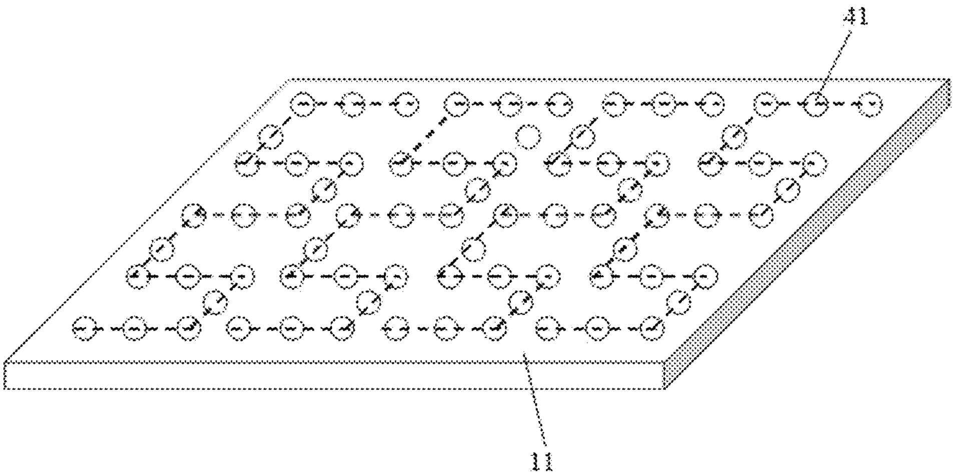
FIG. 19 is a second schematic diagram showing disposing a first passage in a first adhesive layer provided by an embodiment of the present disclosure.
Figure 20:
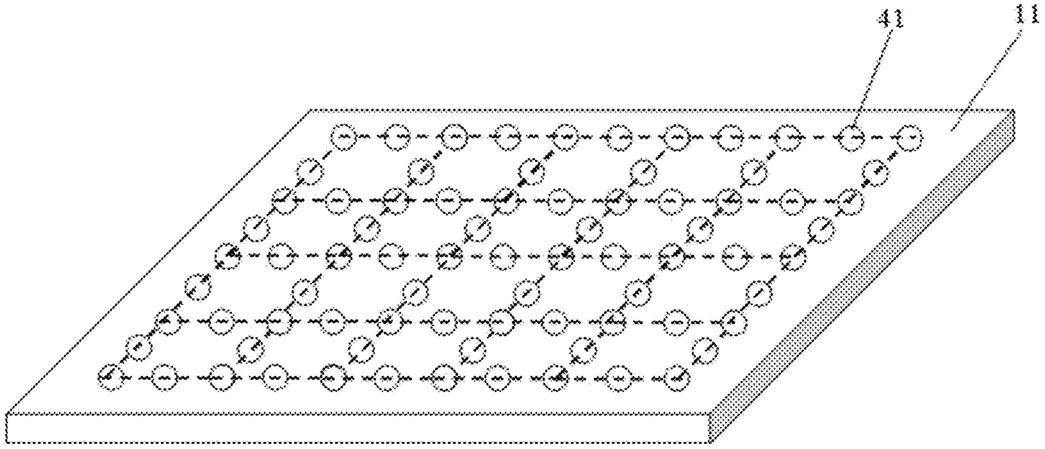
FIG. 20 is a third schematic diagram showing disposing a first passage in a first adhesive layer provided by an embodiment of the present disclosure.
Figure 21:
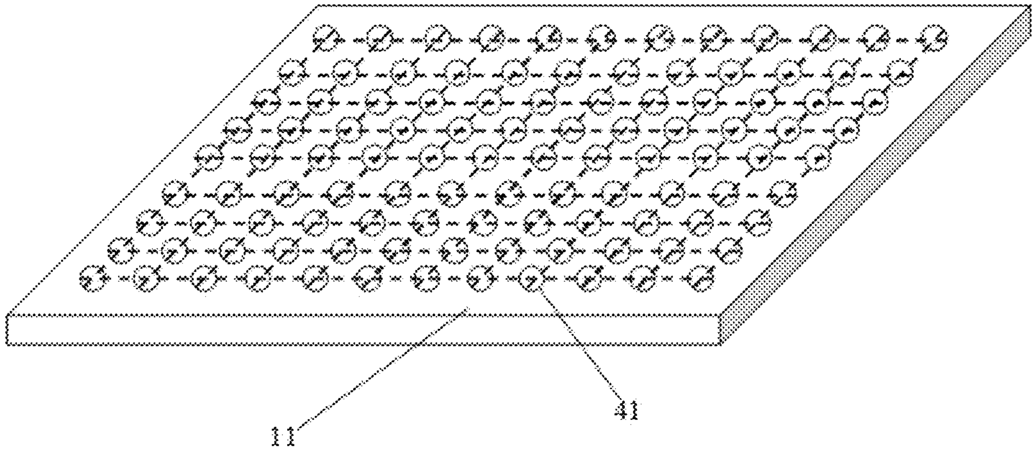
FIG. 21 is a fourth schematic diagram showing disposing a first passage in a first adhesive layer provided by an embodiment of the present disclosure.
Figure 22:
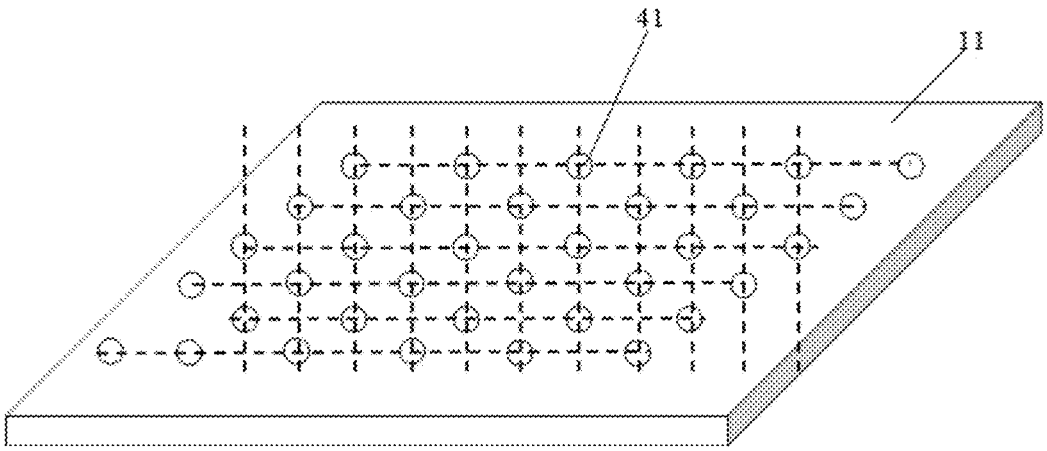
FIG. 22 is a fifth schematic diagram showing disposing a first passage in a first adhesive layer provided by an embodiment of the present disclosure.

In addition, in some embodiments, as shown in FIG. 16 to FIG. 18, a groove opening of the through groove and a groove bottom of the through groove have different dimensions in a first direction. The first direction is a direction perpendicular to the display module 30. The groove opening of the through groove is a part of the through groove close to the backlight module 20, and the groove bottom of the through groove is a part of the through groove close to the display module 30.

In the case that the groove opening of the through groove and the groove bottom of the through groove have different dimensions in the first direction, that is, the groove opening and the groove bottom of the through groove in the polyester resin layer 12 have different dimensions in the first direction, and the polyester resin layer 12 is adhered to the first adhesive layer 11 and the second adhesive layer 13 respectively, then an adhesive of the first adhesive layer 11 may not completely seal the through groove, so that the through groove has a capability of leading out the gas.

Figure 15:
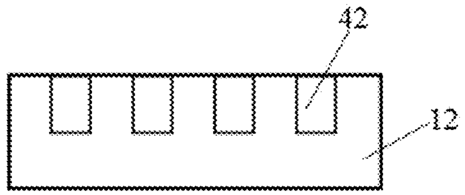
FIG. 15 is a first schematic diagram showing disposing a second passage in a polyester resin layer provided by an embodiment of the present disclosure.

It should be noted that, in the embodiment of the present disclosure, in the first direction, as shown in FIG. 15, the dimension of the groove opening of the through groove may be the same as the dimension of the groove bottom of the through groove, that is, the through groove may be a U-shaped groove.

In addition, in some embodiments, as shown in FIG. 16, the dimension of the groove opening of the through groove in the first direction is less than the dimension of the groove bottom of the through groove in the first direction.

In the case that the dimension of the groove opening of the through groove is less than the dimension of the groove bottom of the through groove in the first direction, when the polyester resin layer 12 is adhered to the first adhesive layer 11, even if some adhesive of the first adhesive layer 11 enters the groove opening of the through groove, the through groove will not be completely sealed, thus ensuring that the through groove has the capability of communicating the gas. Therefore, the gas entering the through holes in the first adhesive layer 11 may enter the through groove and then flow out through the through groove. That is, the dimension of the groove opening of the through groove is less than the dimension of the groove bottom of the through groove in the first direction, so that the through groove is not completely sealed, which is beneficial for leading out the gas from the through groove.

Certainly, in the embodiment of the present disclosure, the dimension of the groove opening of the through groove in the first direction may also be greater than the dimension of the groove bottom of the through groove in the first direction. For example, as shown in FIG. 17, the through groove is a V-shaped groove. The specific shape of the through groove is not limited by the embodiment of the present disclosure herein.

In the embodiment of the present disclosure, because the backlight module 20 and the display module 30 are connected through the bending adhesive layer 10, the air flow passage 40 is disposed between the display module 30 and the bending adhesive layer 10, and the pressure zone exists between the backlight module 20 and the bending adhesive layer 10. If a bubble exists in the pressure zone, the bubble may be discharged from the air flow passage 40, thus avoiding a possible separation between the backlight module 20 and the display module 30 caused by a rescued contact area between the backlight module 20 and the display module 30 due to the accumulation of bubbles in the pressure zone, which further avoids the problem of an increased defective rate of the display devices. That is, in the embodiment of the present disclosure, the air flow passage 40 is provided between the display module 30 and the bending adhesive layer 10, so that the bubble in the pressure zone may be discharged through the air flow passage 40, thereby increasing the contact area between the backlight module 20 and the display module 30, and improving the yield of the display device.

It should be noted that various embodiments in the specification are described in a progressive manner, each embodiment focuses on the difference from other embodiments, and the same and similar parts of various embodiments can be referred to each other.

Although alternative embodiments of the present disclosure have been described, those skilled in the art will be able to make additional changes and modifications to these embodiments once the basic inventive concepts are learned. Therefore, the appended claims are intended be construed to include alternative embodiments and all changes and modifications that fall within the scope of the disclosed embodiments.

Finally, it should be noted that relational terms such as "first" and "second" are used herein merely to distinguish an entity from another entity, and do not necessarily require or imply the existence of any such actual relationship or sequence between these entities. Furthermore, the terms "comprising", "including" or any other variation thereof are intended to cover a non-exclusive inclusion, such that an article or terminal device including a list of elements includes not only those elements but also other elements not expressly listed, or elements inherent to the article or terminal device. Unless being further limited, an element defined by the phrase "comprising a . . . " does not exclude the presence of additional identical elements in the article or terminal device including said element.

The technical solutions provided by the present disclosure have been introduced in detail above. Specific examples are used to illustrate the principles and implementation methods of the present disclosure. Moreover, for those skilled in the art, the specific implementation modes and application scope may be changed based on the principles and implementation methods of the present disclosure. In summary, the contents of this description should not be construed as limiting the present disclosure.

The invention claimed is:

1. A display device, comprising a bending adhesive layer, a backlight module and a display module, wherein:

the backlight module and the display module are connected through the bending adhesive layer;

an air flow passage is provided between the display module and the bending adhesive layer, and a pressure zone exists between the backlight module and the bending adhesive layer;

the air flow passage is configured to discharge a bubble existed in the pressure zone;

a supporting film layer is disposed between the display module and the bending adhesive layer, and the bending adhesive layer comprises a first adhesive layer, a polyester resin layer and a second adhesive layer;

the polyester resin layer is disposed between the first adhesive layer and the second adhesive layer, the first adhesive layer is connected with the backlight module, and the second adhesive layer is connected with the supporting film layer;

the air flow passage comprises a first passage and a second passage;

the first passage is communicated with the pressure zone, and the first passage is communicated with the second passage; and the first passage is disposed in at least one of the first adhesive layer and the polyester resin layer, and the second passage is disposed in at least one of the second adhesive layer and the polyester resin layer.

2. The display device according to claim 1, wherein the first passage is a plurality of through holes disposed in the first adhesive layer, the plurality of through holes penetrate through the first adhesive layer, and the plurality of through holes extend in a direction perpendicular to the display device; and the second passage is a through groove disposed in the polyester resin layer, and the through groove extends from a first surface of the polyester resin layer to a second surface of the polyester resin layer, wherein the first surface of the polyester resin layer and the second surface of the polyester resin layer are two opposite surfaces of the polyester resin layer, and the first surface of the polyester resin layer and the second surface of the polyester resin layer are both parallel to the direction perpendicular to the display device.

3. The display device according to claim 2, wherein the through groove is formed in a third surface of the polyester resin layer, and the third surface of the polyester resin layer is a surface in contact with the first adhesive layer.

4. The display device according to claim 2, wherein the polyester resin layer comprises a plurality of polyester resin blocks arranged at intervals, and a gap between two adjacent polyester resin blocks forms the through groove.

5. The display device according to claim 2, wherein the plurality of through holes are distributed in an array.

6. The display device according to claim 5, wherein the plurality of through holes are arranged at equal intervals.

7. The display device according to claim 6, wherein an interval between any two adjacent through holes is 1 mm to 2 mm.

8. The display device according to claim 2, wherein a groove opening of the through groove and a groove bottom of the through groove have different dimensions in a first direction, wherein the first direction is a direction perpendicular to the display module, the groove opening of the through groove is a part of the through groove close to the backlight module, and the groove bottom of the through groove is a part of the through groove close to the display module.

9. The display device according to claim 8, wherein the dimension of the groove opening of the through groove in the first direction is less than the dimension of the groove bottom of the through groove in the first direction.

10. The display device according to claim 1, wherein the backlight module comprises an optical film layer, a backboard, a flexible printed circuit board and a battery; wherein the bending adhesive layer is fixed in a first region on a first surface of the display module, and the battery is fixed in a second region on the first surface of the display module, wherein the first surface is a surface opposite to a display surface of the display module, the first region is a region in which a bending part of the display device is located, and the second region is a region of the display device other than the bending part; and the backboard is fixed on the bending adhesive layer through the optical film layer, and the flexible printed circuit board is bent and provided on the backboard.

11. A display device, comprising a bending adhesive layer, a backlight module and a display module, wherein:

the backlight module and the display module are connected through the bending adhesive layer;

an air flow passage is provided between the display module and the bending adhesive layer, and a pressure zone exists between the backlight module and the bending adhesive layer;

the air flow passage is configured to discharge a bubble existed in the pressure zone;

a supporting film layer is disposed between the display module and the bending adhesive layer, and the bending adhesive layer comprises a first adhesive layer, a polyester resin layer and a second adhesive layer;

the polyester resin layer is disposed between the first adhesive layer and the second adhesive layer, the first adhesive layer is connected with the backlight module, and the second adhesive layer is connected with the supporting film layer;

the air flow passage comprises a first passage and a second passage;

the first passage is communicated with the pressure zone, and the first passage is communicated with the second passage; and the first passage penetrates through the bending adhesive layer and extends from the first adhesive layer to the second adhesive layer, and the second passage is disposed in the supporting film layer.

12. The display device according to claim 11, wherein the first passage is a plurality of through holes formed in the bending adhesive layer, and the plurality of through holes extend from the first adhesive layer to the second adhesive layer; and the second passage is a through groove formed in the supporting film layer, the through groove extends from a first surface of the supporting film layer to a second surface of the supporting film layer, the first surface of the supporting film layer and the second surface of the supporting film layer are two opposite surfaces of the supporting film layer, and the first surface of the supporting film layer and the second surface of the supporting film layer are both parallel to a direction perpendicular to the display device.

13. The display device according to claim 12, wherein the plurality of through holes are distributed in an array.

14. The display device according to claim 13, wherein the plurality of through holes are arranged at equal intervals.

15. The display device according to claim 14, wherein an interval between any two adjacent through holes is 1 mm to 2 mm.

* * * * *